July 17, 1934.  F. KURTH  1,966,726
STORAGE BATTERY
Original Filed Nov. 27, 1928
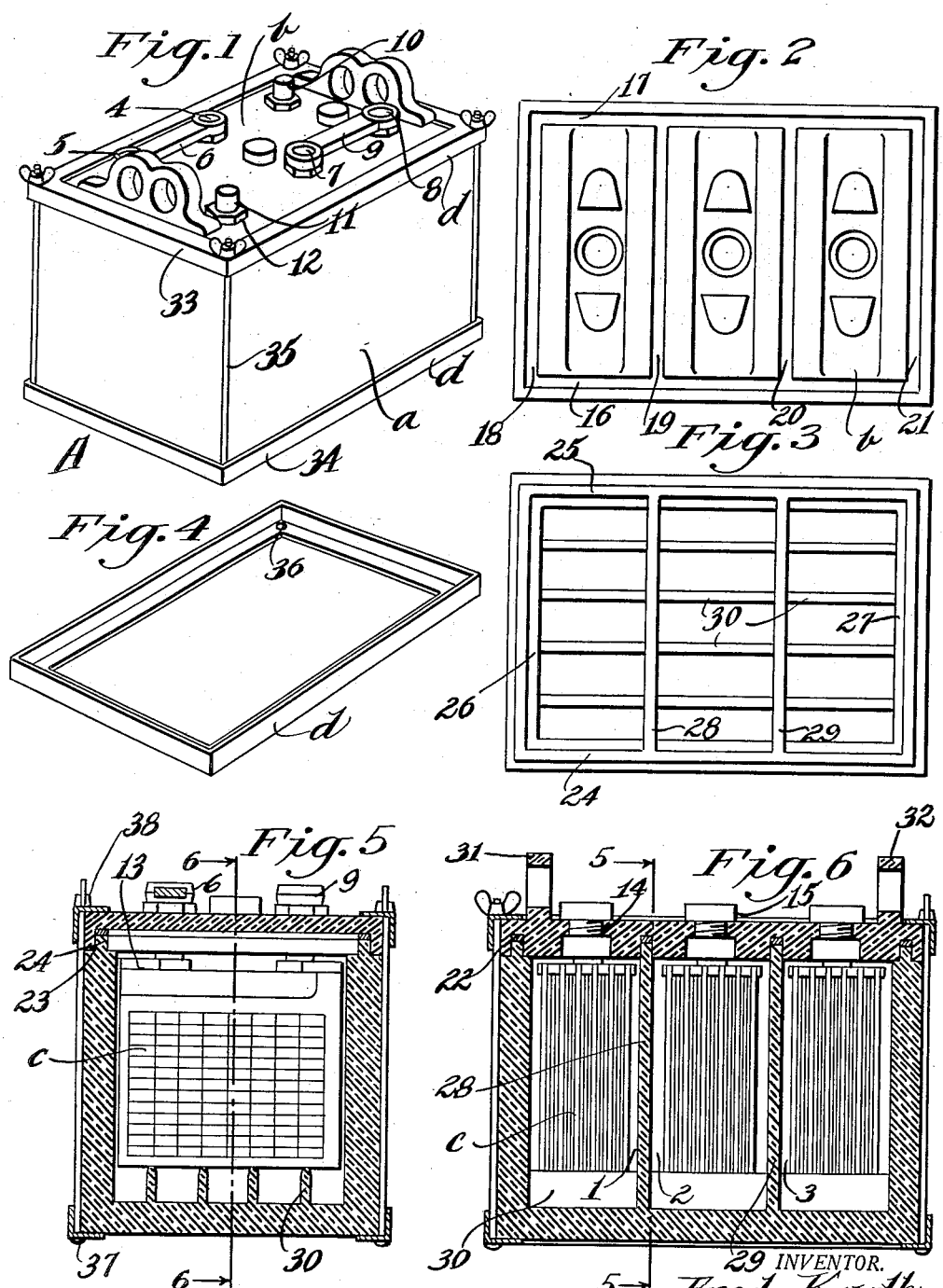

Patented July 17, 1934

1,966,726

UNITED STATES PATENT OFFICE 1,966,726

STORAGE BATTERY

Fred Kurth, Bakersfield, Calif.

Refiled for abandoned application Serial No. 322,235, November 27, 1928. This application July 5, 1932, Serial No. 620,881

2 Claims. (Cl. 136—170)

This invention relates to storage batteries and has for an object the provision of a storage battery, which may be readily assembled and disassembled, within a minimum of time. The general run of storage batteries are provided with what is known as a case or jar within which are confined electrode plates in separate partitions of said case, and a cover carried by the case carries binding posts and the usual connecting bus bars for the several cells of the battery. This cover is usually sealed to the case. Furthermore, the electrodes are formed of lead, which is built up after the cover has been placed in position. When it becomes necessary to take the storage battery apart, due to sulfating or shorting of the plates from various causes, it is necessary to remove the bus bars and grind or cut off the electrodes. It is also necessary to heat the case or jar so that the cover may be removed. The plates are then lifted from the different slots and the case or jar must be cleaned. In reassembling, it is necessary to replace the different electrode plates within the different cells and seat the cover to the case, followed by a building up of the electrodes. This requires skilled labor and is a slow and expensive procedure. With my invention, I have provided a storage battery wherein the cover carries the various electrode plates which are usually in groups and which electrode plates are adapted to be received within cells of the case or jar. The case and the cover are formed so as to interconnect and be held in working relation by a simple detachable means whereby the case and the jar may be readily separated, and when so separated the cover carries the electrode plates. One of the greatset faults in storage batteries is the liability to breakage of the separators and when this occurs, the cells of the battery often short. With this invention, it is possible to remove the cells with the separators so that worn and deteriorated separators may be replaced with new ones and it is evident that the construction just outlined would render this a simple procedure. It, therefore, becomes a simple matter without the removal of bus bars and the like to thoroughly clean the case and likewise renew or substitute new electrode plates for those that have deteriorated for any reason whatsoever.

The invention has for an object the provision of a battery which is inexpensive of manufacture, simple of construction, durable, will stand severe shock without injury, which may be readily inspected within a minimum of time, and which is generally superior in use and serviceability.

With the above and other objects in view, the invention consists in the novel and useful provision, formation, construction, association and relative arrangement of parts, members and features, all as shown in a certain embodiment in the accompanying drawing, described generally, and more particularly pointed out in the claims.

In the drawing:

Figure 1 is a perspective view of the improved storage battery,

Figure 2 is a bottom plan view of the cover of said battery, the plates being removed therefrom, Figure 3 is a plan view of the interior of the case, Figure 4 is a perspective view of one of the frame members for holding the case and cover in working relation, Figure 5 is a cross sectional view on the line 5—5 of Figure 6, and, Figure 6 is a cross sectional view on the line 6—6 of Figure 5.

Referring now with particularity to the drawing, the improved battery is designated as an entirety by A, and the same includes a jar or case $a$, a cover $b$, and plates or electrodes $c$ adapted to be held in groups and within cells 1, 2, 3, of the case. The elements so far are common to any storage battery. In the present instance, however, the electrodes or plates $c$ are adapted to be carried by the cover $b$. It is customary to provide what are termed positive and negative electrode plates and said plates are spaced apart by what is known as separators. The positive plates are arranged in groups and the negative plates lie therebetween with the separators, as just stated, between the positive and negative plates. Separate posts are provided for each group of positive and negative plates, for instance, in Figure 1, the post 4 might connect with and hold a group of positive plates, and the post 5 a group of negative plates with the two posts connected by a bus bar 6. As this is a three-cell type of battery, post 7 would hold negative plates and post 8 positive plates, with a bus bar between said posts 7 and 8. The post 10 would be negative and the post 11 positive. As stated, these posts extend through the cover and are secured to the cover in the usual manner, such as by nuts 12. Within the cover, said posts carry extensions, such as 13, which are directly secured to the electrode plates $c$. The usual filling openings are provided within the cover, as shown at 14, with caps 15 for closing said openings. The said cover is grooved or channeled longitudinally and laterally adjacent the edges thereof, as shown for the longitudinal grooves at 16 and 17 lateral grooves at 18 and 19, 20 and 21, with all of said grooves interconnecting. Within said grooves, I place a gasket or gaskets 22. The case or jar $a$ is provided along its top edge 23 with lateral and longitudinal tongues or flanges, as shown at 24 and 25 for the longitudinal flanges, and at 26 and 27 for the lateral flanges.

Inspection of Figure 6 shows that the battery is of the three-cell type, with partition walls 28 and 29 separating the cells. These partition walls likewise extend upwardly within the case so that the top edges thereof lie in the same plane with the tops of the flanges 24 to 27, inclusive. The case or jar is provided on the inner surface of the bottom wall with the usual spaced ribs 30. The cover may be provided with the usual end handles 31 and 32. In order to hold the cover to the case, I provide means designated generally as $d$ constituting upper and lower frames 33 and 34 and members 35 cooperating with the frames for holding the frame in a certain spaced relation. The frames are of angle formation, being provided with two legs at right angles and of a size sufficient to entirely surround and bound the said cover and case in one instance for the top frame and the entire bottom of the case in the second instance. In the present form of the battery, the frame would be rectangular in form and certain of the legs are transversely bored adjacent corners thereof, as shown at 36 in Figure 4. Each member 35 would constitute a long bolt having a head 37 bearing against a face of one of the legs of the bottom frame, with a nut, such as a wing nut 38, bearing against the face of a leg of the upper frame. These frames, of course, are placed in position after the battery has been assembled with the cover in place and the members 35 would be arranged at each corner of the case and of the frames, as shown in Figure 1. When the inner ends 38 are clamped, the frames will hold the cover and the case in tight engagement. The flanges as well as the upper portions of the partitions 28 will be received within the grooves of the cover and bear against the gasket 22 with the result that leakage of fluid is impossible at this particular zone.

The operation, uses and advantages of the invention are as follows:

If for any reason it becomes necessary to investigate the electrodes in the different cells, the wing nuts may be loosened from the bolts, whereupon the top frame may be removed and the cover lifted from the case which will, in turn lift all the different electrodes from the cells. The electrodes may be examined and the fluid content of the case removed and the case washed which would, of course, remove all substances from between the ribs 30. After the electrode plates have been examined, and perhaps renewed, the cover may again be placed in position, the caps 15 removed, and fluid of proper gravity placed therein, the framing place in position, and the members 35 tightened to hold the cover to the case. It is obvious even to the most uninitiated that the general arrangement of the battery is such as to render repairs thereof an easy matter and frequent inspection of the battery may be obtained.

The inventor is aware that there are batteries on the market wherein and whereby the covers may be detached from the case, but so far as the inventor knows, no battery provides the simple, quick detachable framing for holding the cover to the case, in combination with the tongue and groove arrangement with a gasket between the tongues and the grooves. Most batteries of this character that the inventor is aware of depend upon some sealing compound for holding the cover to the case. The present battery is readily adaptable for use with molded cases and covers, such as rubber or rubber composition. The framing is so formed as to apply an even pressure all along the edge of the cover and the case. Thus, any tendency of the cover or case to warp is effectively overcome.

The inventor is aware that certain storage batteries have attempted to secure the cover to the case by a quick detachment means, but said detachment means is so arranged that warpage or a swelling may occur as between the cover and the case with the result that the acid contents may be spilled from the case.

The present battery overcomes numerous defects prevailing in the present batteries and those of the type like the inventor's.

It is obvious that various changes and modifications and variations may be made in practicing the invention in departure from the particular showing of the drawing without departing from the true spirit thereof.

This application is filed in place of my abandoned application Serial No. 322,235, filed November 27, 1928.

I claim:

1. The combination with a battery box having a closed bottom and a removable closure member overlying the top edges forming a receptacle having angular top and bottom edges when assembled, the said closure member having projecting terminals and depending plate sets carried thereby, of a rigid one piece frame angled correspondingly to the bottom edge of the receptacle and surrounding the same with one portion underlying and engaging the bottom in alignment with the side walls and the other extending upwardly and spaced therefrom, a rigid one piece top frame angled correspondingly to the top edge of the receptacle and surrounding the same with one portion overlying and engaging the top of the closure member in alignment with the side walls and the other extending downwardly and spaced therefrom, and means exterior of the receptacle connecting the frames to clamp the closure on the box and evenly distribute strain at all points of contact.

2. The combination with a battery box having a closed bottom and a removable closure member overlying the top edges forming a receptacle having angular top and bottom edges when assembled, the said closure member having projecting terminals and depending plate sets carried thereby, of a rigid one piece frame angled correspondingly to the bottom edge of the receptacle and surrounding the same with one portion underlying and engaging the bottom in alignment with the side walls and the other extending upwardly and spaced therefrom, a rigid one piece top frame angled correspondingly to the top edge of the receptacle and surrounding the same with one portion overlying and engaging the top of the closure member in alignment with the side walls and the other extending downwardly and spaced therefrom, a series of spaced bolts surrounding the exterior of the receptacle and connecting the bottom and closure engaging portions of the frames, and nuts on said bolts to clamp the frames together to secure the closure member on the box and evenly distribute the strain at all points of contact.

FRED KURTH.